(12) United States Patent
Shiue et al.

(10) Patent No.: US 6,500,575 B1
(45) Date of Patent: Dec. 31, 2002

(54) IN-CELL AIR MANAGEMENT

(75) Inventors: Lih-Ren Shiue; Shinn-Horng Yeh, both of Hsinchu; Wen-Jin Lee, Taipei; Pei-Jen Wang, Hsinchu; Chum-Sam Hong, Taipei; Shu-Chin Chou, Hsinchu; Horng-Jee Wang, Taipei Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/472,745

(22) Filed: Dec. 27, 1999

(51) Int. Cl.$^7$ .......................... G01M 12/06; G01M 2/12
(52) U.S. Cl. ............... 429/27; 429/34; 429/83; 29/623.1
(58) Field of Search ................. 429/27, 28, 29, 429/34, 72, 82, 83; 29/623.1

(56) References Cited

U.S. PATENT DOCUMENTS

| | | | | |
|---|---|---|---|---|
| 4,902,278 A | * | 2/1990 | Maget | .................. 429/27 X |
| 5,258,239 A | * | 11/1993 | Kobayashi | .................. 429/27 |
| 5,356,729 A | * | 10/1994 | Pedecini | .................. 429/27 |
| 5,454,922 A | * | 10/1995 | Joshi et al. | .................. 204/265 |

* cited by examiner

Primary Examiner—Stephen Kalafut
(74) Attorney, Agent, or Firm—W. Wayne Liauh

(57) ABSTRACT

A method for fabricating cylindrical and prismatic rechargeable metal-air batteries is devised. The method includes using micro fans to control air flowing through the batteries via air pathways between the packs of electrodes and separator sheet. The air pathways are created by protrusions printed or molded on plastic spacer film. The air is used by the positive electrode for generating electricity when the metal-air battery is discharged. By conjunction of a second positive electrode and an energy storage device, the micro fans can be actuated as soon as the metal-air battery is demanded by a load. The in-cell air management can not only supply air for reactions but also shut the system to preserve materials when they are not in service.

34 Claims, 5 Drawing Sheets

IN-CELL AIR MANAGEMENT

BACKGROUND OF THE INVENTION

1. Field of the Invention

The present invention relates to a method for fabricating cylindrical and prismatic rechargeable metal-air batteries and their structure, which depends on micro pumps to create air draft passing the gaps between packs of electrodes and separators, and the micro pumps are turned on and off by an in-cell actuating system.

2. Related Art

The flourishing telecommunications have wired people around the world. In the near future, cellular phones will become daily tools rather than luxuries. As internet proliferates and prevails at every level, more and more people will connect the web via portable electronic devices such as cellular, notebook and PDA (personal digital assistant). All the activities in conjunction with increasing power need of the devices, more than ever, depend heavily on rechargeable batteries.

The fashion-trend of the portable electronic devices is an incessant reduction in size and weight. It imposes great challenges on the battery manufactures. They have to produce smaller and thinner batteries, and yet the capacity and other performances of the batteries are not to be compromised. In designing a battery, developers must consider its energy density (Wh/l) and specific energy density (Wh/Kg). The former has more impact than the latter, as the reduction in size is easier to observe than that in weight. Currently, rechargeable lithium ion (Li+) and nickel-metal hydride (Ni-MH) batteries are the two principal energy sources for many portable electronic devices. However, their dominance might be replaced by lithium polymer batteries someday. The new batteries hold some advantages including size and weight.

ZAB (Zn-air battery) should be another promising candidate for the rechargeable battery of next generation. Firstly, ZAB is very economical as Zn is an essential, cheap metal and the cathode of ZAB reacts on oxygen that is abundant and free. Secondly, ZAB is a safe and environmentally friendly battery. Thirdly, comparing with Li+ and Ni-MH batteries, ZAB is superior in energy densities: Z-A (200 Wh/Kg), Li+ (115 Wh/Kg) and Ni-MH (70 Wh/Kg); Z-A (276 Wh/l), Li+ (270 Wh/l) and Ni-MH (240 Wh/l). These numbers certify ZAB as a legitimate contender as the portable energy source.

Nevertheless, a rechargeable ZAB acceptable to the portable electronic industry is overdue. There are many technical hurdles need to be crossed before a viable secondary ZAB for 3C (communication, computer and consumer) applications is realized. Most of the technical difficulties are studied and addressed with feasible solutions, except one major problem is unsolved. The problem is the form factor that prevents ZAB from being made in cylindrical and prismatic forms as the commonly seen Li+ and Ni-MH batteries. The form factor is related to the air supply to the cathodes of ZABs when they are in cylindrical or prismatic form.

U.S. Pat. No. 5,569,551 discloses an electrically rechargeable ZAB using a Zn anode sandwiched between two air cathodes. While U.S. Pat. No. 5,554,452 reveals another electrically rechargeable ZAB module consisted of six-pack of batteries. Both works arranged the cathodes adjacent to air inlets. Because of the orientation, only two pairs of electrodes are allowed in one battery. In order to enhance the energy density as well as the power density, the resulted batteries are often bulky and heavy. U.S. Pat. No. 4,885,217 taught the use of a polymer web or net for constructing air cathodes. The net is sealed within the cathode to form an air pocket. Nevertheless, the spacers are rigid and the design can not generate cylindrical batteries.

The management of air of ZAB for a portable electronic device can be seen in U.S. Pat. No. 5,888,664. The air pathway is installed outside the batteries, and the module is bulky. The present invention devises an in-cell air management. When ZAB is configured in cylindrical or prismatic form, the air conduit can be constructed inside the battery similar to the water channel in U.S. Pat. No. 2,988,587. '587 taught a water-activated magnesium reserve battery. The water channel for providing water to the cathodes is created by means of glass beads embedded on the cathodes. The present invention utilizes spacer sheets containing protrusions on forming air pathway during the fabrication of batteries. Micro fans are implemented in the middle of both end caps of batteries to create air draft in the pathway. The in-cell air management can effectively direct air to all layers of cathode.

SUMMARY OF THE INVENTION

The present invention provides an in-cell air management for metal-air batteries using the combination of:

1) spacer sheets with protrusions to form air pathway for the cathodes; and
2) micro pumps (fans) to create air draft in the pathway.

With the in-cell air management, metal-air batteries can be fabricated in cylindrical and prismatic forms. The gap-forming spacer sheets can be prepared via screen printing method or injection molding method of protrusion pattern on porous and thin substrates such as polypropylene, polyamide, polyethylene oxide, polyethylene terephthalate, polyacrylamide and polyurethane. As known to those skilled in the art, the protrusion materials may include epoxy, acetal, acrylic and urethane. If screen printing method is used, the protrusions are printed on the substrates and are subsequently cured by heat, radiation or moisture. While injection molding method can integrate the protrusions and spacer sheets in one step.

The spacer sheet is concentrically winded with other sheets of cell component such as electrodes and separator sheets to form the cylindrical batteries. The spacer sheet is placed with the protrusions (dots) against the cathode sheet. In making prismatic ZAB, the spacer sheet and cell-components sheets of the desired dimension are stacked in sequence with the protrusions against the cathode sheets. Because of the presence of protrusions, air pathway is formed by each layer of the cathode sheet.

Henceforth, it is thus an object of the present invention to provide air pathway for the cathodes of metal-air battery in close environments. The air pathway allows more pairs of electrodes per cell. The utilization of battery space is greatly enhanced. The energy density, power density, and working voltage of the resulted batteries are consequently improved.

It is another object of the present invention to impose micro pumps at both ends of metal-air batteries for creating air draft inside the batteries. Air is used by the cathodes of metal-air battery to generate electricity during discharge. The air pathway and micro pumps form the in-cell air management.

It is a further object of this invention to use the in-cell air management to fabricate metal-air battery in cylindrical and prismatic forms. The aforementioned shapes are the two most efficient configurations of batteries for portable electronic devices. With the in-cell air management, the form factor limitation on metal-air battery is lifted.

It is another further object of this invention to use the in-cell air management to control airflow in the batteries. As the air supply to the cathode is ceased, the chemical reactions of metal-air battery will stop. In theory, the battery can be preserved indefinitely. In other words, the in-cell air management is used to prolong the shelf life of metal-air battery.

It is a yet further object of this invention to devise an actuating system for the actuation of micro pumps. The actuating system includes a second cathode, which does not react on air, and an energy storage device such as supercapacitor. When a load is in request, metal anode works with the second cathode to provide nominal current to the supercapacitor. The latter amplifies the energy output to power the micro pumps to turn on metal-air battery. The in-cell actuating system is devised to impart metal-air battery a self-sustained breathing battery.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Cylindrical Metal-Air Battery

Figure 1:
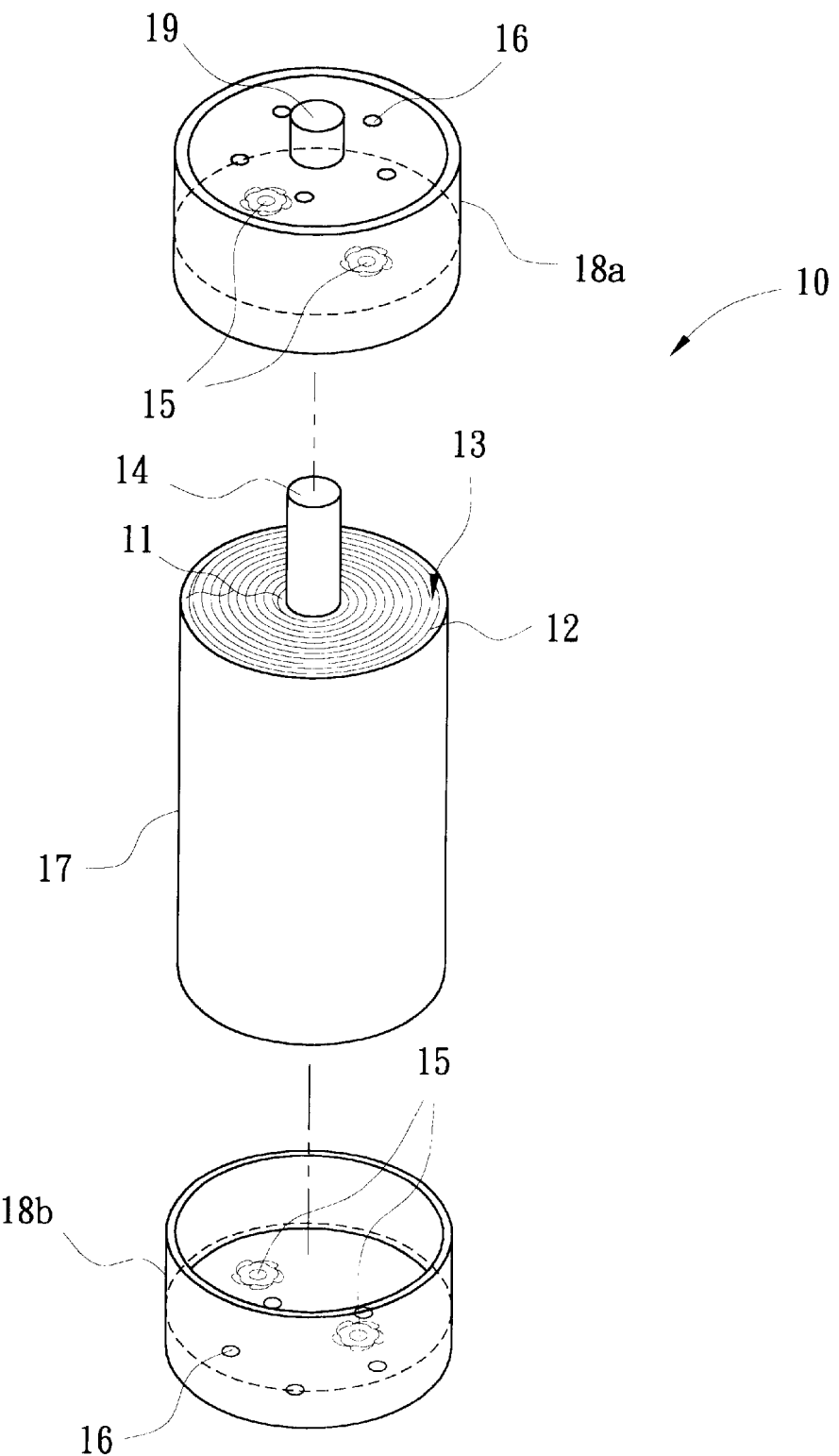
FIG. 1 is a schematic view of in-cell air management for cylindrical rechargeable ZAB in accordance with the instant invention.
Figure 2:
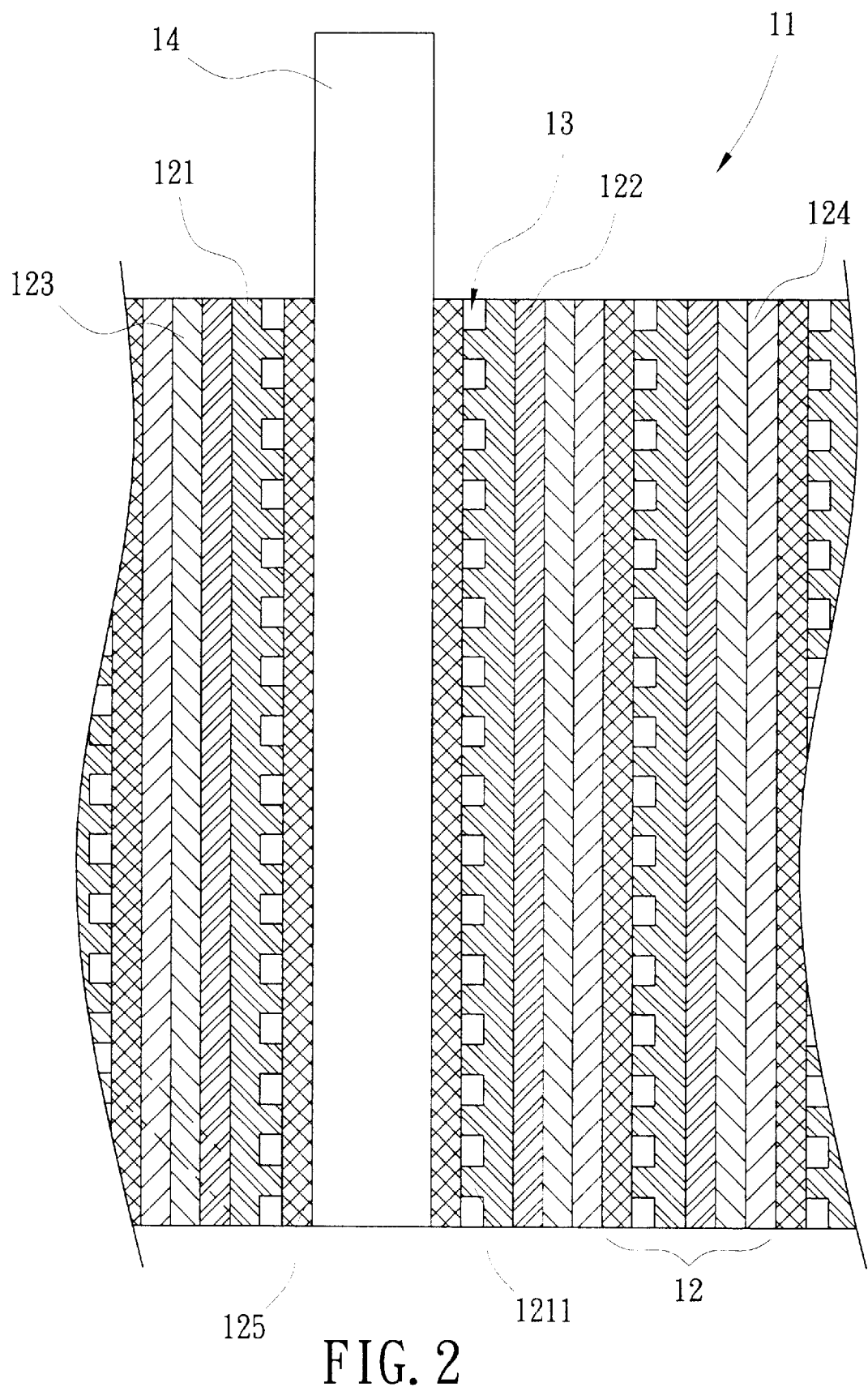
FIG. 2 illustrates a cross-sectional side view of the cell core of FIG. 1.

Referring now to FIG. 1 and FIG. 2, there is illustrated a preferred embodiment of cylindrical rechargeable metal-air battery according to this invention and a cross-sectional side view of the cell core 11 of FIG. 1. The cylindrical metal-air battery 10 comprises:

a positive electrode 14 and a negative electrode (not shown) as the outputs of the battery 10;

a body, which includes:

a laminated compound material 12 including in the order of an insulating sheet 124, a metal anode sheet 123, a separator sheet 122, a spacer sheet 121 having a plurality of protrusions such as dots 1211, and a cathode sheet 125, wherein the thickness of every sheet is preferably at ≦1 mm except the insulating sheet 124 which can be much thinner;

a cell core 11 formed by a roll of the laminated compound material 12 wrapped concentrically around the positive electrode 14;

a plurality of air pathways 13 are formed by the dots pressed against the cathode sheet 125, and air becomes a cathode reactant which connects to the positive electrode 14 and the metal anode connects to the negative electrode;

a housing 17 made of metal or plastic for containing the cell core 11;

a first cap 18a and a second cap 18b which are on the opposite ends of the housing 17 axis for connecting the housing 17 to snugly seal the cell core 11; on the surface of both caps 18a, 18b, air inlets 16 are provided for the passage of air and the positive electrode contact 19 of the battery 10 is placed at the center of the first cap 18a;

a plurality of micro fans 15 for creating air draft in the air pathways 13 of the metal-air battery 10, wherein the micro fans 15 are installed in the middle region of the first and second cap 18a, 18b, respectively, of the battery 10; and an in-cell actuating system (not shown) for activating the micro fans 15.

For clearance of illustration, the in-cell actuating system, air filter and provision to prevent leakage of electrolyte is not shown.

The metal anode sheet 123 and cathode sheet 125 can be made by coating homogeneous pastes of the corresponding active materials with Teflon binders and solvents on current collectors such as perforated aluminum foil, perforated copper coil, copper mesh or nickel mesh. After the application of coatings, the sheets 123,125 can be dried in an oven to drive off the solvents. The sheets 123, 125 are then cut to the desired dimensions for assembly. The material of metal is applicable to zinc, aluminum, lithium, magnesium and iron.

Figure 3:
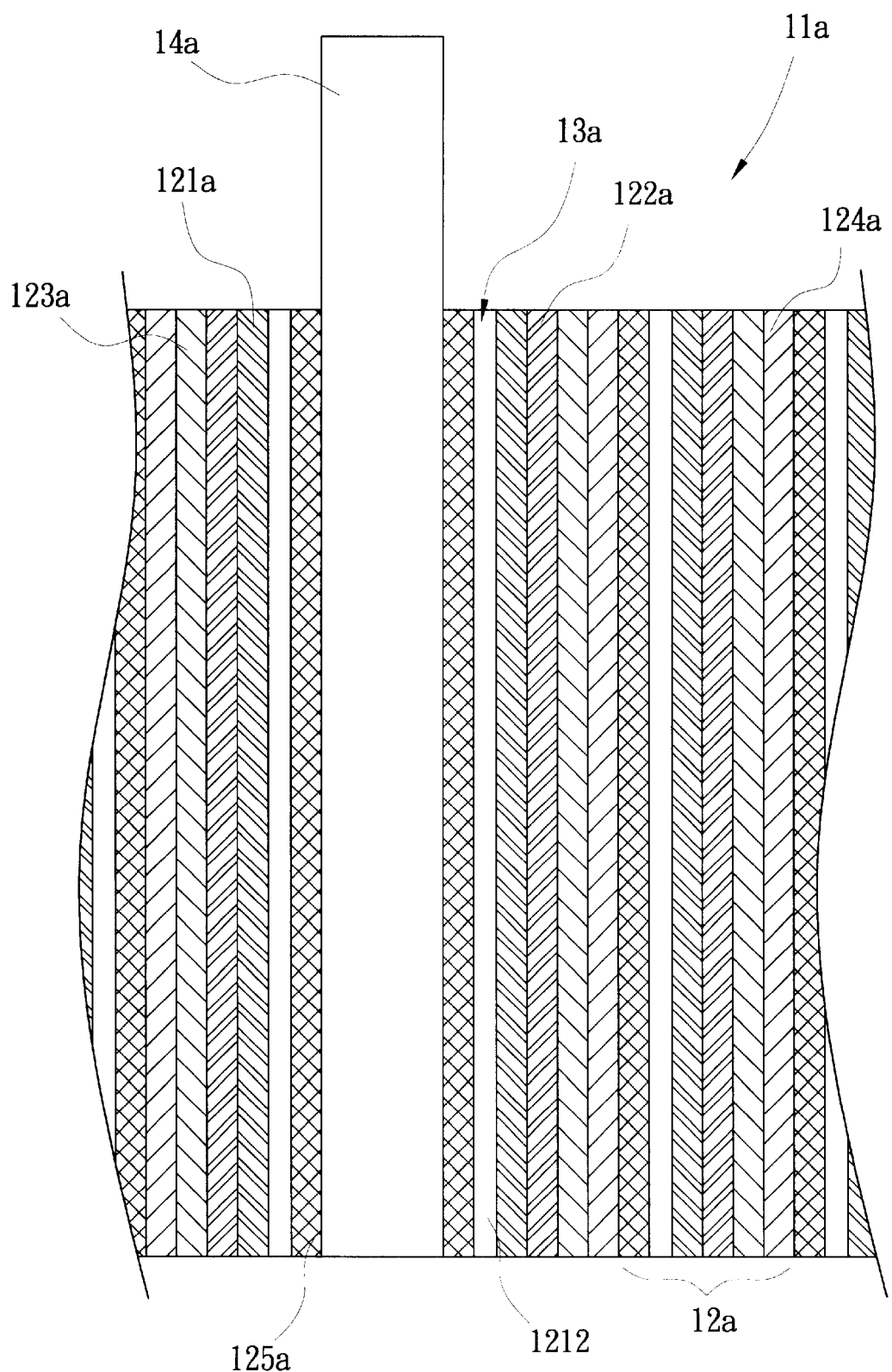
FIG. 3 is a cross-sectional side view of the cell core according to another embodiment.

The protrusions on the spacer sheet 121 can be prepared by screen printing method or injection molding method and the shape of protrusions can be dotted shape or rib 1212 (refer to FIG. 3). Protrusions and the spacer sheet 121 can be the same material or compatible materials. The materials of spacer sheets 121 may include polypropylene, polyamide, polyethylene oxide, polyethylene terephthalate, polyacrylamide and polyurethane. The materials of protrusions may include epoxy, acetal, acrylic and urethane. If screen printing method is used, the protrusions are printed on the spacer sheets 121 and are subsequently cured by heat, radiation or moisture. While injection molding method can integrate the protrusions and spacer sheets 121 in one step.

The size of protrusions effects the airflow and the energy capacity of battery 10. The height of protrusions is preferably from 0.1 to 0.5 mm decided by a compromise between airflow and battery 10 capacity. The spacer sheets 121 can be purchased or prepared in-house to a thickness between 10 and 20 mil. Both protrusions and spacer sheets 121 should be inert towards the alkaline electrolyte used. The protrusions should also have adequate mechanical strength.

The function of the separator sheet 122 is to isolate the metal anode sheet 123 and the air cathode, and it also provides ionic conduction between the electrodes. The separator sheet 122 should hold in the electrolyte for long-term use. To those skilled in the art, the materials for the separator sheets 122 may include polyvinyl alcohol, cotton wool, cellulose and cellophane. The thickness of the separator sheet 122 is preferably ≦1 mm.

Lastly, the insulating sheet 124 is generally a PTFE film of 10–20 mil thick, and it is placed adjacent to the metal anode sheet 123 to prevent electric short. The positive electrode 14 such as metal lead is the contact for the cathode sheet to the outside circuit, while the contact for the metal anode sheet 123 is through a tab spot (not shown) welded to the metal anode sheet 123.

Referring now to FIG. 3, is a cross-sectional side view of the cell core according to another embodiment. The laminated compound material 12a includes in the order of an insulating sheet 124a, a metal anode sheet 123a, a separator sheet 122a, a spacer sheet 121a having a plurality of protrusions, and a cathode sheet 125a and the cell core 11a is formed by a roll of the laminated compound material 12a wrapped concentrically around the current collector 14a. The difference between this embodiment and that of FIG. 2 is the shape of protrusions is rib 1212 and air pathways 13a are formed by the ribs 1212 and the cathode sheet 125a.

Micro Pumps (Fans)

The micro pumps proposed in the instant invention can be fabricated by LIGA (German acronym for Lithographe, Galvanoformung, und Abformung) technique. The pumps may be composed of a bending element and at least one force element. The bending element may include single crystal silicon (such as silicon wafer) or an electroactive polymer (EAP) diaphragm. While the force element may include a piezoelectric crystal (such as zinc oxide), a magonestrictive alloy (such as terbium-dysprosium-iron), or a thermally dependent film (such as aluminum). The force element is attached to the bending element. When a voltage is applied to the force element, it will induce a shape change such as length of the element. The shape change of the force element will cause the bending diaphragm to flex inward or outward depending on the location of the force element. The flexing motion of the bending element will develop a flow of fluid such as air through a check valve of the micro pumps into a device which the pumps are attached. The intake of air depends on the voltage applied to the force element. If there is sufficient space inside a battery, a micro rotary fan or blower can be used as micro fans 15 to replace the bending diaphragm for drawing air into the battery 10. Regardless of which design is selected, the mechanical unit is secured in the middle region of the first cap 18a and the second cap 18b of battery 10. Furthermore, the micro fans 15 at the opposite sides of battery 10 are arranged to flex or spin in opposite direction so that air draft is created in the air pathways 13. The flow rate of air is preferably greater than 10 cc. per minute, and the power consumption of micro fans 15 is preferably smaller than 0.5 W.

In-Cell Actuating System

To impart self-sustenance to metal-air battery 10 with the in-cell air management, an actuating system is devised inside the battery 10. The in-cell actuating system is composed a power source, an energy converter, and a control network. Before air is drawn into metal-air battery 10, the power for activating the micro fans 15 comes from cell reactions involving metal anode sheet 123 and a second cathode such as NiOOH, $MnO_2$ or AgO. The reaction of the second cathode does not require air, and it can be configured to work with metal anode sheet 123 to generate electricity repeatedly. In fabricating cylindrical metal-air battery 10, a small section of the second cathode chosen can be integrated with the cathode sheet on the same sheet. On the other hand, a sheet of the second cathode can replace one of the cathode sheets in the stacks for forming prismatic metal-air battery 20 (refer to FIG. 4). In the hybrid battery, prior to the initiation of metal/air cathode, metal/second cathode can discharge independently to provide electricity required for powering the micro fans 15.

The energy converter is a design using an energy storage device such as supercapacitor (also known as electric double layer capacitor, EDLC, or ultracapacitor). The preparation of supercapacitor is similar to that of battery. The active material for superacapacitor includes active carbon and metal oxide (such as $RuO_2$, $IrO_2$, $Rh_2O_3$, $T_{a2}O_5$, $V_2O_5$, $M_oO_3$, $TiO_2$, $SnO_2$, NiO, $F_{e2}O_3$ or $CoO_x$). The supercapacitor depends on large specific surface area of the electrodes to store a large amount of charge (up to thousands Farad) which is classified as double layer capacitance or the so-called pseudo-capacitance. Because of the capability of quick release of all its stored charge, the supercapacitor has a much greater power density than batteries. AS a mater of fact, the supercapacitor is often used as load leveler for batteries. We discover that the supercapacitor can amplify the power of batteries by several times. During the fabrication of metal-air battery, one or several pairs of thin electrodes of the supercapacitor are enclosed. The same electrolyte, KOH, is used for both metal-air battery and supercapacitor. In this configuration, the battery electrodes (metal/second cathode) provide current to charge the supercapacitor through a control network. The on-board control network includes a sensor circuit, which monitors the demand of load, and an electronic on/off switch. When a load is in demand, the sensor circuit will issue a signal to turn on the switch, which then orders the charge of supercapacitor (charge can be completed in less than a second) and the delivery of power to activate the micro pumps (fans). As soon as a load is ceased, the sensor will terminate the current flow from the supercapacitor to the micro pumps (fans), and the battery is closed from atmosphere.

Prismatic Metal-Air Battery

Figure 4:
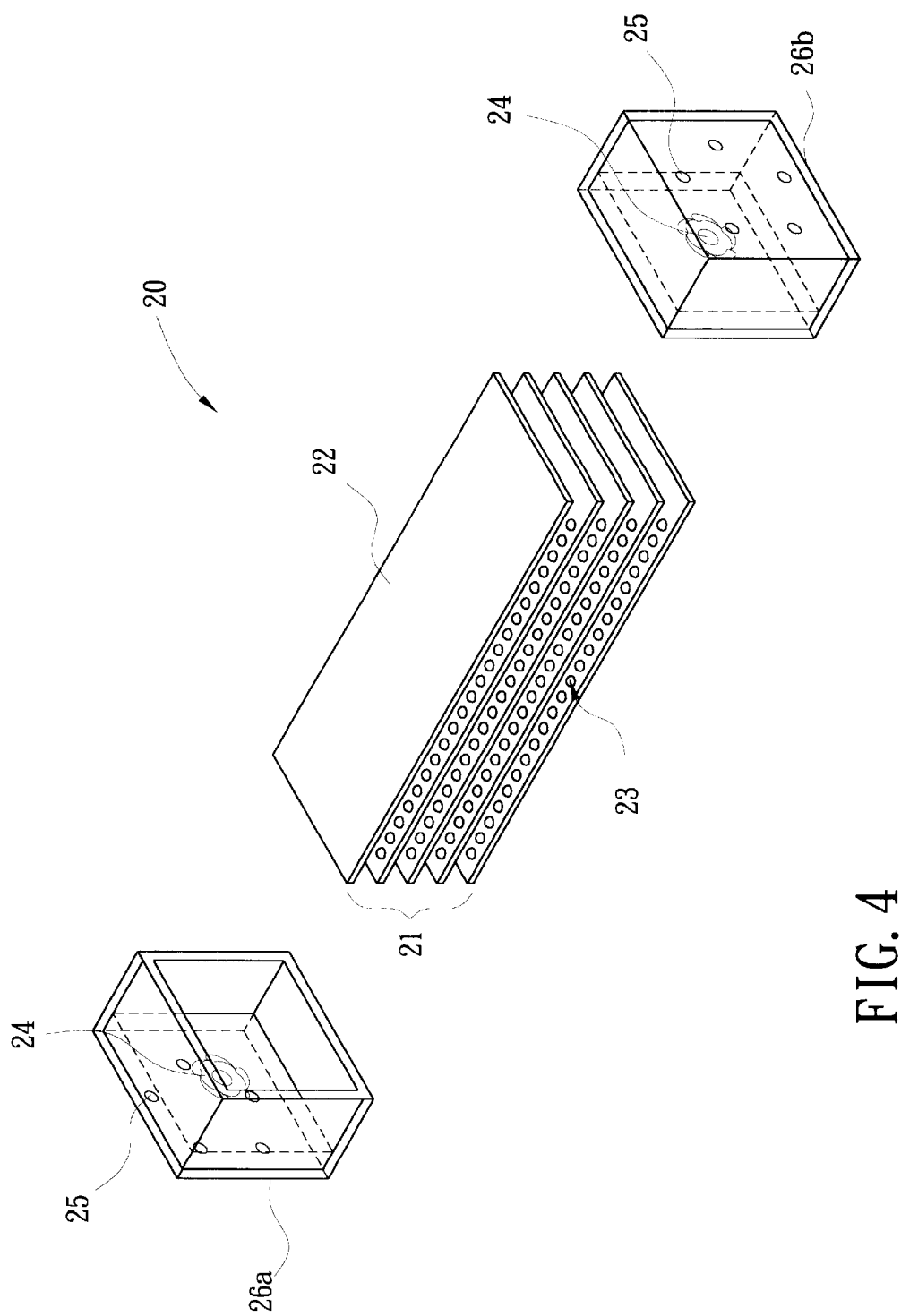
FIG. 4 is a schematic view of in-cell air management for prismatic rechargeable ZAB in accordance with the instant invention.
Figure 5:
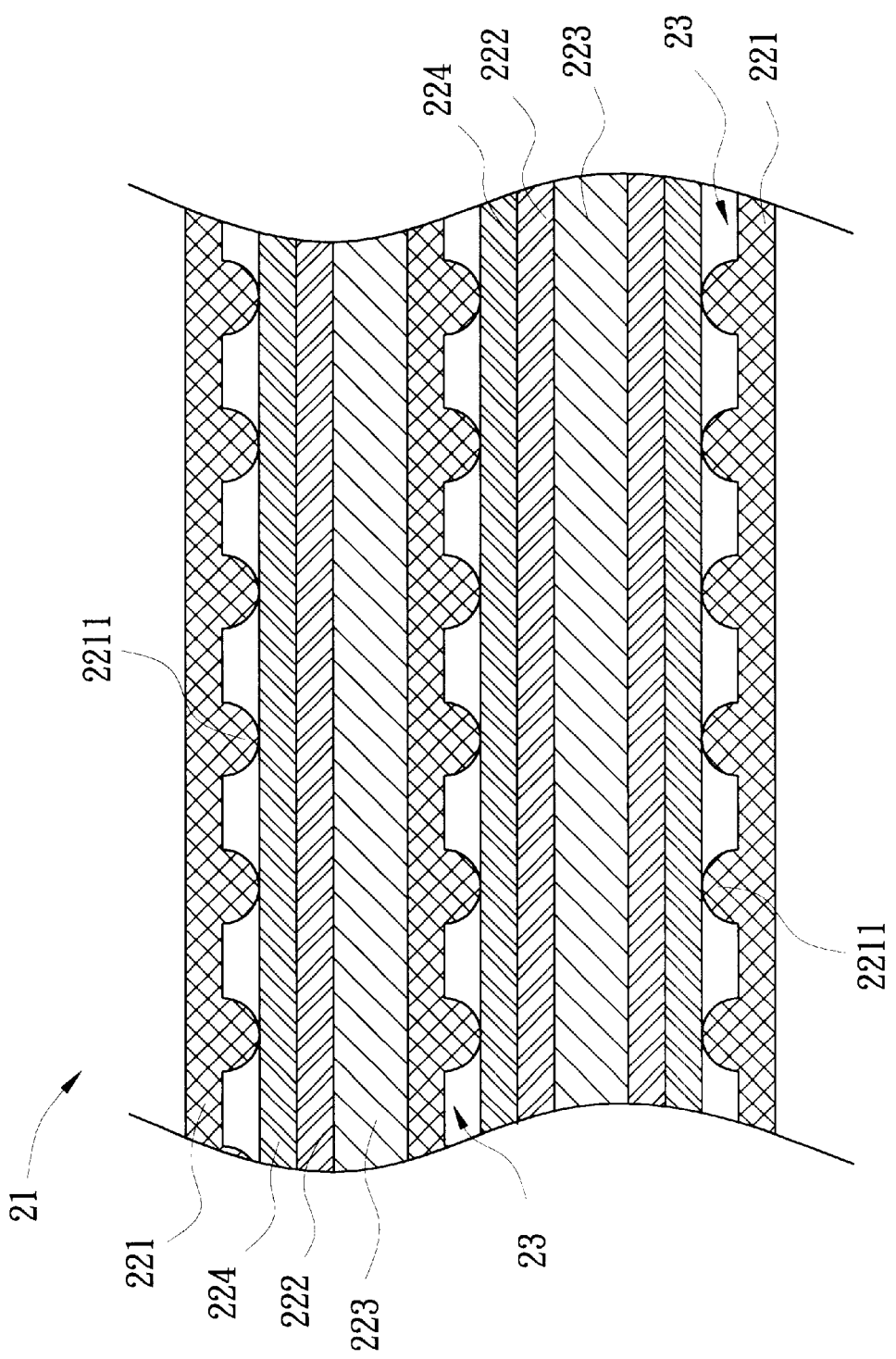
FIG. 5 illustrates a cross-sectional side view of the cell core of FIG. 4.

FIG. 4 shows a preferred arrangement of in-cell air management for a prismatic rechargeable metal-air battery according to this invention. FIG. 5 illustrates a cross-sectional side view of the cell core 21 of FIG. 4. The arrangement of cell components in FIG. 4 is slightly different from that in FIG. 1. There are only four sheets of laminated compound material 22 to form stacks in FIG. 4 where the insulating sheet 124 is not required. However, a two-sided dotted spacer sheet 221 is sandwiched between two sheets of the cathode sheet 224. Then, atop every cathode sheet 224 is the separator sheet 222 which is superimposed by the metal anode sheet 223. The dots 2211 on the spacer sheets 221 are also pressed against the cathode sheets 224 to form air pathway 23. Similar to that in FIG. 1, micro fans 24 are also installed in the middle region of the first and second caps 26a, 26b of battery 20 of FIG. 4. When micro fans 24 are in motion, air will be drawn through air inlets 25 into the air pathways 23.

To best illustrate the in-cell air management in prismatic metal-air batteries 20, the body of the battery housing is not shown. Neither air filter, the in-cell actuating system for activating the micro fans 24, nor provisions for preventing leakage of electrolyte are shown. Many sheets of the laminated compound material 22 can be stacked in the aforementioned sequence to form a prismatic metal-air battery 20 with multiple-pair of electrodes as shown in FIG. 4. Each pair of +/− electrodes forms a unit cell. Depending on the need of applications, the cells can be connected internally in-series or in-parallel to construct the desired batteries. If a series connection is employed, the nominal working voltage of the resulted battery is the sum of voltage of each unit cell (about 1.22 V). On the other hand, if the cells are connected in-parallel, the resulted battery should have a total capacity equal to the sum of individual capacity. Therefore, the in-cell air management allows metal-air battery to be fabricated in cylindrical and prismatic forms, and multi-electrode metal-air battery is achieved. With more pairs of electrodes contained in a given battery package, both energy density and power density of the battery are enhanced.

Electrically Rechargeable Electrodes of ZAB

TABLE I

Anode Formulation

| Ingredients | Weight (%) |
|---|---|
| ZnO | 40 |
| $Ca(OH)_2$ | 40 |
| Polyvinyl alcohol | 10 |
| $H_2O$ | 10 |

TABLE II

Cathode Formulation

| Ingredients | Weight (%) |
|---|---|
| $CaMnO_3$ | 67 |
| Acetylene black | 21 |
| Polytetraethylene solution | 12 |

TABLE I contains a preferred embodiment of electrically rechargeable formulation for the anode, while TABLE II for the cathode. The preparation process of the two electrodes is identical. First, the materials according to the formulation is charged and stirred in a homogenizing mixer for more than an hour. After mixing, the anode paste is roller-coated on a copper foil, while the cathode paste is on a copper mesh. After drying in an oven, the other side of each substrate is coated with the same anode or cathode paste. The coatings are also dried in oven. A dotted spacer sheet is made by screen printing of an UV-curable acrylic formulation on a thin polypropylene film. The openings of the screen ranges from 0.1 to 0.5 mm. The dots are then cured by UV radiation using a mercury lamp. A carboxylmethyl cellulose film of 1 mm thick is prepared as the separator sheet. The above sheets of cell components are cut to the desired dimensions, and cylindrical and prismatic batteries are prepared.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for fabricating a metal-air battery, comprising the steps of:
providing a laminated compound material including a metal anode sheet, a separator sheet, a spacer sheet having a plurality of protrusions, and a cathode sheet;
providing a positive electrode and a negative electrode;
forming a cell core having a plurality of air pathways by a roll of the laminated compound material Wrapped concentrically around the positive electrode; and
providing a plurality of micro pumps near at least one end of the cell core;
wherein the air pathways are formed by the protrusions pressed against the cathode sheet, and air is drawn by the micro pumps into the air pathways, which becomes a cathode reactant connecting to the positive electrode, and the metal anode connects to the negative electrode.

2. The method for fabricating the metal-air battery according to claim 1, wherein the material of the spacer sheet is selected from the group consisting of polypropylene, polyamide, polyethylene oxide, polyethylene terephthalate, polyacrylamide and polyurethane.

3. The method for fabricating the metal-air battery according to claim 1, wherein the thickness of the spacer sheet is between 10 mil and 20 mil.

4. The method for fabricating the metal-air battery according to claim 1, wherein the protrusions are prepared by screen printing method.

5. The method for fabricating the metal-air battery according to claim 1, wherein the protrusions are prepared by injection molding method.

6. The method for fabricating the metal-air battery according to claim 1, wherein the material of the protrusions is selected from the group consisting of epoxy, acetal, acrylic and urethane.

7. The method for fabricating the metal-air battery according to claim 1, wherein the height of the protrusion ranges from 0.1 mm to 0.5 mm.

8. The method for fabricating the metal-air battery according to claim 1, wherein the micro pumps are fabricated using a LIGA technique.

9. The method for fabricating the metal-air battery according to claim 1, wherein the micro pumps include a bending element and a force element, the force element is attached to the bending element and a shape change of the force element causes the motion of the bending element.

10. The method for fabricating the metal-air battery according to claim 9, wherein the force element is selected from the group consisting of piezoelectric crystal, magonstrictive alloy and thermally dependent film.

11. A method for fabricating a metal-air battery, comprising the steps of:
providing a plurality of laminated compound material including a metal anode sheet, a separator sheet, a spacer sheet having a plurality of protrusions, and a cathode sheet;
providing a positive electrode and a negative electrode;
forming a cell core having a plurality of air pathways by the laminated compound material stacked in parallel; and
providing a plurality of micro pumps adjacent to at least one end of the cell core;
wherein the air pathways are formed by the protrusions pressed against the cathode sheet and air is drawn by the micro pumps into the air pathways, which becomes a cathode reactant connecting to the positive electrode and the metal anode connects to the negative electrode.

12. The method for fabricating the metal-air battery according to claim 11, wherein the material of the spacer sheet is selected from the group consisting of polypropylene, polyamide, polyethylene oxide, polyethylene terephthalate, polyacrylamide and polyurethane.

13. A method for fabricating a metal-air battery, comprising the steps of:
providing a plurality of laminated compound material including a metal anode sheet, a separator sheet, a spacer sheet having a plurality of protrusions, and a cathode sheet;
providing a positive electrode and a negative electrode;
forming a cell core having a plurality of air pathways by the laminated compound material stacked in parallel; and
providing a plurality of micro pumps adjacent to at least one of the cell core;

wherein the air pathways are formed by the protrusions pressed against the cathode sheet, and air is drawn by the micro pumps into the air pathways, which becomes a cathode reactant connecting to the positive electrode and the metal anode connects to the negative electrode.

14. The method for fabricating the metal-air battery according to claim 11, wherein the protrusions are prepared by screen printing method.

15. The method for fabricating the metal-air battery according to claim 11, wherein the protrusions are prepared by injection molding method.

16. The method for fabricating the metal-air battery according to claim 11, wherein the material of the protrusions is selected from the group consisting of epoxy, acetal, acrylic and urethane.

17. The method for fabricating the metal-air battery according to claim 11, wherein the height of the protrusion ranges from 0.1 mm to 0.5 mm.

18. The method for fabricating the metal-air battery according to claim 11, wherein the micro pumps are fabricated using a LIGA technique.

19. The method for fabricating the metal-air battery according to claim 11, wherein the micro pumps include a bending element and a force element, the force element is attached to the bending element and a shape change of the force element causes the motion of the bending element.

20. The method for fabricating the metal-air battery according to claim 19, wherein the force element is selected from the group consisting of piezoelectric crystal, magonstrictive alloy and thermally dependent film.

21. The method for fabricating the metal-air battery according to claim 11, wherein the laminated compound material further includes an insulating sheet to prevent the air cathode and the metal anode sheet short circuit.

22. A metal-air battery, which comprises:
a positive electrode and a negative electrode as the outputs of the battery;
a body, which includes:
a cell core which is formed by a plurality of the laminated compound materials concentrically wrapped about the positive electrode, each of the laminated compound materials includes a metal anode sheet, a separator sheet, a spacer sheet having a plurality of protrusions, and a cathode sheet;
a plurality of air pathways formed by the protrusions pressed against the cathode sheet, such that air becomes a cathode reactant which connects to the positive electrode and the metal anode connects to the negative electrode;
a housing for encasing the cell core;
a first cap and a second cap which are on the opposite ends of the housing axis for connecting the housing to seal the cell core;
a plurality of micro pumps for creating air draft in the air pathways of the metal-air battery; and
an in-cell actuating system for activating the micro pumps.

23. The metal-air battery according to claim 22, wherein the thickness of the spacer sheet is between 10 mil and 20 mil.

24. The metal-air battery according to claim 22, wherein the shape of the protrusion is dotted shape.

25. The metal-air battery according to claim 22, wherein the shape of the protrusion is rib.

26. The metal-air battery according to claim 22, wherein the height of the protrusion ranges from 0.1 mm to 0.5 mm.

27. The metal-air battery according to claim 22, wherein the micro pumps are installed in the first cap and the second cap.

28. The metal-air battery according to claim 27, wherein the micro pumps in the first cap and the micro pumps in the second cap are flexing in opposite direction.

29. The metal-air battery according to claim 22, wherein the micro pumps include a bending element and a force element, the force element is attached to the bending element and a shape change of the force element causes the motion of the bending element.

30. The metal-air battery according to claim 29, wherein the bending element of the micro pumps is structured as a rotary fan.

31. The metal-air battery according to claim 22, wherein the in-cell actuating system comprises:
a power source for activating the micro pumps before air is drawn into the battery, wherein a section of the air cathode is replaced by a second cathode for working with the metal anode to generate current repeatedly;
an energy converter for storing charge and be a load leveler for the battery; and
a control network including a sensor circuit for monitoring the load demand of the current, an electronic on/off switch for ordering the charge of the energy converter and the delivery of power to activate the micro pumps when a load is in demand.

32. The metal-air battery according to claim 31, wherein the second cathode is selected from the group consisting of NiOOH, $MnO_2$ and AgO.

33. The metal-air battery according to claim 31, wherein the energy converter is selected from the group consisting of a supercapacitor, an electric double layer capacitor (EDLC) and an ultracapacitor.

34. The metal-air battery according to claim 22, further comprising a plurality of air inlets on the first and second cap for the passage of air.

* * * * *